United States Patent [19]

Luppi et al.

[11] 4,005,845
[45] Feb. 1, 1977

[54] SEAT ASSEMBLY INCLUDING A TURNAROUND-TYPE SEAT

[75] Inventors: Carlos Enrique Luppi; Marino Antonio Tavolini; Juan Carlos Roberto Travaini, all of Rosario, Argentina

[73] Assignee: Deere & Company, Moline, Ill.

[22] Filed: Mar. 15, 1976

[21] Appl. No.: 667,165

[52] U.S. Cl. .............................. 248/419; 248/418; 297/346
[51] Int. Cl.[2] ....................................... F16M 13/00
[58] Field of Search ................ 248/157, 419–425, 248/161, 162, 415–418, 158; 296/65 R; 297/344–349; 180/77 S

[56] References Cited

UNITED STATES PATENTS

| | | | |
|---|---|---|---|
| 2,833,367 | 5/1958 | Pool et al. | 297/217 X |
| 2,946,373 | 7/1960 | McCanse et al. | 248/421 |
| 3,300,172 | 1/1967 | Noller et al. | 248/421 X |
| 3,412,968 | 11/1968 | Rose et al. | 248/425 |
| 3,437,373 | 4/1969 | Boston | 296/65 R |
| 3,448,820 | 6/1969 | Aiello et al. | 296/65 R X |
| 3,542,424 | 11/1970 | Bingley et al. | 296/65 R X |
| 3,747,723 | 7/1973 | Peterson et al. | 248/425 X |
| 3,839,757 | 10/1974 | Grimes | 297/349 X |
| 3,893,728 | 7/1975 | Holopainen | 297/349 X |

FOREIGN PATENTS OR APPLICATIONS 1,301,013   12/1972   United Kingdom ............... 248/419

Primary Examiner—Lawrence J. Staab

[57] ABSTRACT

A tractor includes a seat swivelly mounted on a single seat support arm or member that is vertically swingably mounted on the chassis of the tractor for movement about a horizontal transverse axis between a generally horizontal forward position for disposing the seat in a forwardly facing position for tractor operation and a generally vertical rearward position for disposing the seat in a rearwardly facing position for backhoe operation. The axis about which the seat may swivel is related to the angular displacement of the arm from its forward to its rearward position such that when the arm is repositioned the seat may be repositioned by rotating it through 180°. Latch members are provided for releasably retaining the arm and the seat in selected positions and a single control arm is connected to the latch members so as to simultaneously unlock the arm and the seat when it is desired to reposition the arm and the seat.

8 Claims, 6 Drawing Figures

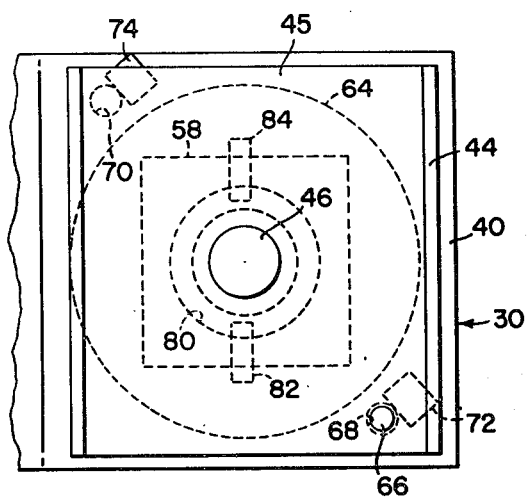
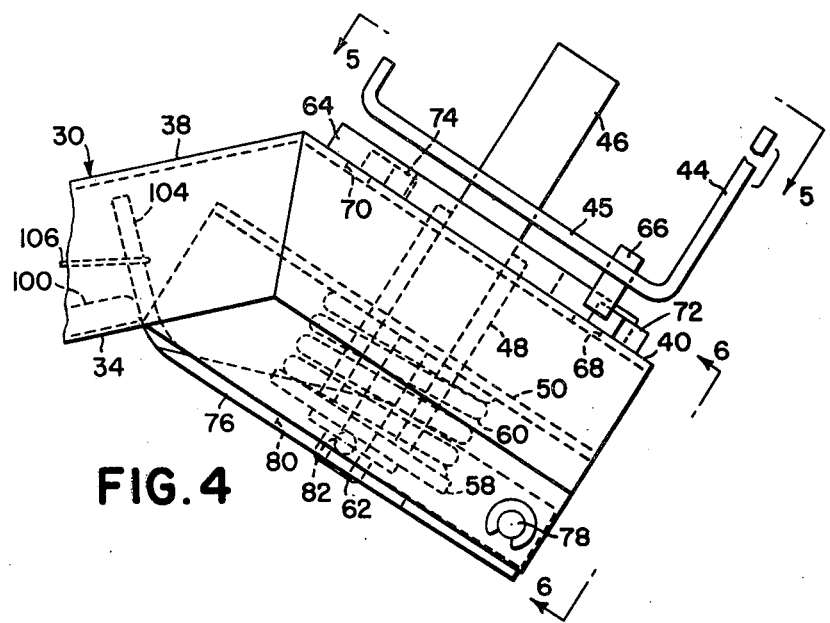
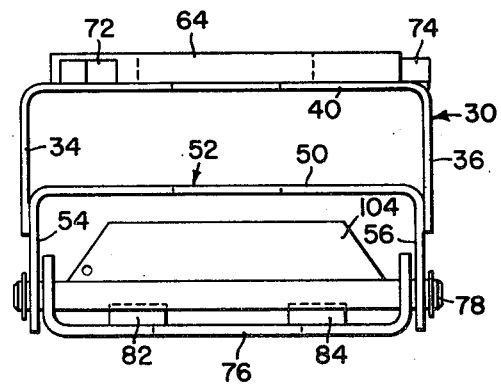

SEAT ASSEMBLY INCLUDING A TURNAROUND-TYPE SEAT

BACKGROUND OF THE INVENTION

The present invention relates to a turn-around type tractor seat assembly which is operative for disposing a seat either forwardly for tractor operation or rearwardly for backhoe operation and more specifically relates to a releasable latch mechanism for use in such an assembly.

Seats of some prior art turn-around type tractor seat assemblies are adjustably connected to a seat support structure which is in turn adjustably connected to the tractor chassis. In these known constructions, which are exemplified by U.S. Pat. No. 2,946,373 issued to McCanse et al on 26 July 1960 and U.S. Pat. No. 2,833,367 issued to Pool et al on 6 May 1958, separate means are employed for releasably fixing the seat and seat support in desired positions of adjustment and these means require the operator to employ tools to effectuate the adjustments by removing and reinstalling bolts and the like. Such adjustments are undesirable from the standpoint of being time consuming and also in that it may result in parts being dropped and lost.

SUMMARY OF THE INVENTION

According to the present invention, there is provided a novel latch mechanism for releasably securing a seat of a turn-around type seat assembly in an adjusted position on a seat support member and for releasably securing the seat support member in an adjusted position on a tractor chassis.

A broad object of the invention is to provide a latch mechanism which is selectively actuatable to an unlocked position for simultaneously releasing a seat for movement relative to a seat support and for releasing the seat support for movement relative to a vehicle chassis location.

A more specific object is to provide first and second lock members for respectively releasably securing a seat and seat support in desired adjusted positions and to interconnect the lock members such that unlocking operation of one will effectuate unlocking of the other.

Another object is to provide a latch mechanism, as described in the foregoing paragraph, including a control lever which is connected to the lock members through connections which afford a minimum of looseness between parts so as to ensure simultaneous operation of the lock members through movement of the lever.

These and other objects will become apparent from a reading of the following description in conjunction with the appended drawings.

BRIEF DESCRIPTION OF THE DRAWINGS

FIG. 4 is a side elevational view showing the connection of the seat with the seat support arm.

FIG. 5 is a view of the means swivelly mounting the seat taken along the line 5—5 of FIG. 4.

FIG. 6 is an end view of the seat support arm and latch arm taken along the line 6—6 of FIG. 4.

DESCRIPTION OF THE PREFERRED EMBODIMENT

Figure 1:
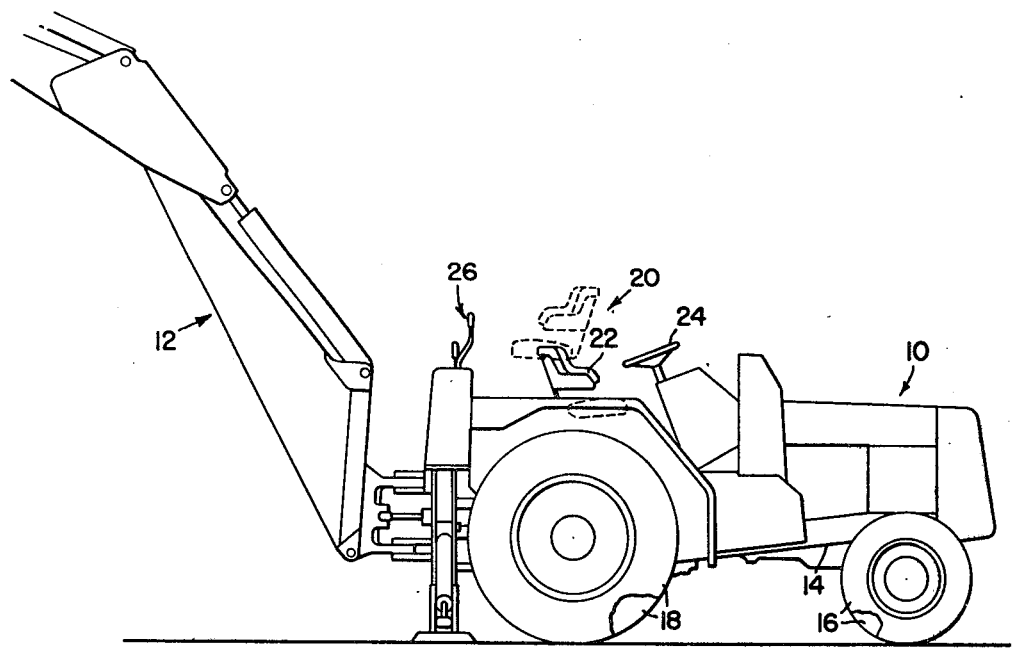
FIG. 1 is a right side elevational view of a tractor-backhoe combination showing the tractor seat assembly in solid lines in a tractor-operating position and showing the seat assembly in dashed lines in a backhoe-operating position.

Referring now to FIG. 1, therein is shown a conventional industrial tractor indicated in its entirety by the reference numeral 10 and having a backhoe 12 connected to the rear end thereof. The tractor 10 includes a main frame 14 supported on front and rear ground and drive wheels 16 and 18, respectively. Supported on the tractor chassis between the rear wheels 18 is a seat assembly 20 constructed, in a manner to be presently described, such that a seat portion 22 thereof is movable between a forwardly facing, tractor-operating position, as shown in solid lines in FIG. 1, for disposing a seated operator for easy reach of a steering wheel 24, and a backhoe operating position, as shown in dashed lines in FIG. 1, for disposing an operator within easy reach of a plurality of backhoe control levers as shown at 26.

Turning now to FIGS. 2 through 6, it can be seen that the seat assembly 20 includes a base or support member 28 adapted for connection to the tractor chassis at a location between the rear wheels 18. One end of a channel-like, elongate seat support arm member 30 is vertically pivotally connected to a rear portion of the base member 28 through means of a horizontal transverse pivot pin or bolt 32. As considered in its full line position in FIGS. 2 and 3, the seat support arm 30 includes right and left depending flanges 34 and 36 joined by a web 38. The web 38 includes a downwardly and forwardly inclined forward end portion 40 which defines a seat mounting portion, as will be described hereinafter.

The underside of the seat 22 is defined by a mounting plate 42 extending between and fixed, as by welding to opposite legs of a bracket 44. The legs of the bracket 44 are joined by a web 45 forming a base of the bracket. The web 45 of the bracket 44 is fixed to a cylindrical pivot post or rod 46 which is in turn rotatably received in a cylindrical sleeve 48 that is fixed in the web portion 40 and in a web 50 of a channel member 52 having opposite flanges or legs 54 and 56 joined to the web 50 and fixed, as by welding, to the right and left flanges 34 and 36 of the seat support arm 30. Surrounding the lower end of the sleeve 48 and interposed between the underside of the web 50 and a square spring retainer 58 is a coil compression spring 60. A screw 62 extends axially into the lower end of the pivot post 46 and is tightened against the spring retainer 58. The spring 60 thus acts to pull downwardly on the pivot post or rod 46 which, in turn, normally maintains the web 45 of the mounting bracket 44 against a circular bearing plate 64 that is fixed to the top of the web portion 40.

Figure 2:
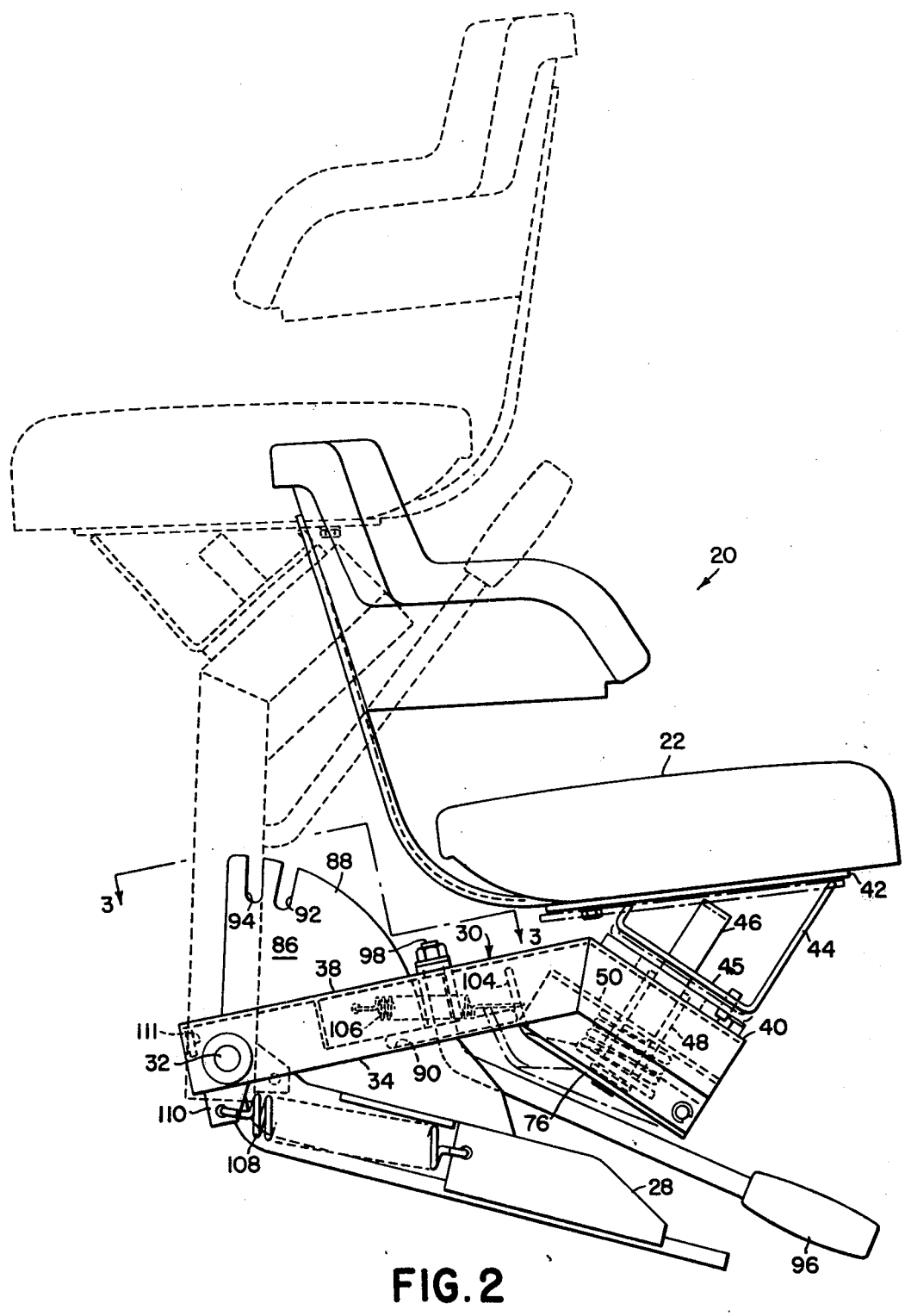
FIG. 2 is a right side elevational view of the seat assembly showing the latter in solid lines in the tractor-operating position and showing it in dashed lines in the backhoe operating position and further showing a latch mechanism in solid lines in an unlocked condition releasing the seat and seat support arm, and in broken lines in a latched condition fixing the seat and seat support arm in place.

For the purpose of retaining the seat 22 in either its forwardly facing position, shown in broken lines in FIG. 2, or in its rearwardly facing position, shown in dashed lines in FIG. 2, a pin 66 is fixed to the web 45 and the web 38 is provided with forward and rearward holes 68 and 70, respectively, located diametrically opposite each other relative to the pivot post 46. Fixed on the web 40 adjacent the holes 68 and 70 are forward and rearward stop-forming blocks 72 and 74 which are disposed for being engaged by the pin 66 to position the latter for alignment with the holes 68 and 70 during repositioning the seat in a manner to be presently described.

Provided for moving the pivot post 46 upwardly so as to effect disengagment of the pin 66 from one of the holes 68 or 70, is a plate-like arm 76 having its forward end pivotally connected to the flanges 54 and 56 of the channel member 52 by means of a horizontal transverse pivot pin 78, the arm 76 being provided with a circular opening 80 which provides clearance for the head of the screw 62. A pair of cylindrical abutment members 82 and 84 are respectively fixed to the top of the arm 76 at diametrically opposite locations to the right and left of the post 46 in positions for engagement with the underside of the spring retaining member 58. Thus, when the arm 76 is in its solid line position shown in FIG. 2, the post 46 is held upwardly and the pin 66 is held out of engagement with the web 38. When the arm 76 is moved to its dashed lined position shown in FIG. 2, the pin 66 will move into engagement with the forward hole 68 so as to prevent rotation of the seat about the axis of the post 46.

Figure 3:
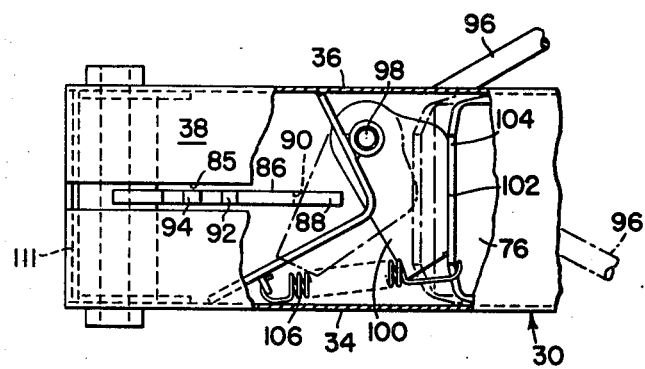
FIG. 3 is a view taken along the line 3—3 of FIG. 2 with parts broken away for clarity.

Located centrally between the right and left flanges 34 and 36 in a slot 85 provided in the web 38 of the seat support arm 30 is a vertical plate 86 having an outer surface 88 formed arcuately about the pivot pin 32. For the purpose of retaining the seat support arm 30 in either a forwardly extending position as shown in solid lines in FIG. 2, or in one of two upwardly extending positions, one of which is shown in dashed lines in FIG. 2, the plate 86 is provided with three latch receptacles 90, 92 and 94, respectively, in the form of notches extending inwardly from the surface 88 towards the pivot pin 32. The first receptacle 90 is located in a lower portion of the plate 86 and the second and third latch receptacles 92 and 94 are respectively angularly displaced approximately 65° and 75° counterclockwise (FIG. 2) from the latch receptacle 90. A latch operating lever 96 has a rearward end portion pivotally connected to the seat support arm 30, as at 98, for movement about an axis which extends generally tangential to the surface 88 of the plate 86. Fixed for rotation with the lever 96 is a latch member 100 (FIG. 3) which is disposed for movement into and out of selected ones of the receptacles 90, 92 and 94 through operation of the lever 96 when the seat support arm 30 is positioned so as to bring the latch member 100 into alignment with the selected one of the latch receptacles. The latch member 100 has a forward marginal edge which forms a cam surface 102 which is engaged with an upturned rear end 104 of the arm 76, the cam surface 102 being shaped so as to move the arm 76 from its broken line position to its solid line position in FIG. 2 when the lever 96 is moved from its broken line position to its solid line position as shown in FIG. 3.

Thus, it will be appreciated then that the lever 96 may be operated to effect simultaneous disengagement of the latched member 100 from the plate 86 and disengagement of the pin 66 from the web 38 of the seat support arm 30. The engagement between the cam surface 102 and the end 104 of the arm 76 is maintained through means of a coil tension spring 106 connected between the arm 76 and the seat support arm 30.

For aiding the movement of the seat support arm 30 and thus the seat 22 between the solid line and dashed line positions shown in FIG. 2, there is provided a coil tension spring 108 which is connected between the base 28 and a tab 110 which forms part of the arm 30 and projects downwardly below the pivot pin 32.

On the pivoted end of the seat support arm 30, there is a web 111 fixed, as by welding, to the right and left flanges 34 and 36 and the web 38 so as to act as an end stop that bears against the base member 28 when the arm 30 is swung to a position so as to align the latch member 100 with the latch receptacle 94, as shown in FIG. 2.

It is here important to note that the pivot post or rod 46 makes an angle of about 57° with the horizontal when the seat 22 is in a forward position for tractor operation as shown in solid lines in FIG. 2. In order that the pivot post 46 be similarly disposed relative to the horizontal when the arm 30 is moved to place the seat in its backhoe operating position, as shown in dashed lines in FIG. 2, it is necessary that the seat support arm 30 be swung through an angle equal to 180° minus two times the angle of inclination of the post 46. Such an angle of movement of the support arm 30 corresponds to the distance between the first and second latch receptacles 90 and 92 while the latch receptacle 94 is approximately 10° beyond that angular position which would dispose the pivot 46 at the same angle for both its raised and lowered positions. Thus, the seat 22 as shown in dashed line positions as shown in FIG. 2, is positioned slightly different relative to the horizontal than it is in its solid line position. It will thus be appreciated that the seated assembly 20 may be adapted for use with different backhoe configurations by merely changing the angle of inclination of the post 46 and making a corresponding change in the angular distance through which the support arm needs to be swung to place the seat in its alternate position. However, the angle of inclination of the pivot post 46 should be no less than zero degrees nor no more than about 80° in order to make the mounting of the seat 22 to the support arm 30 as simple as possible.

The description of the operation is as briefly as follows. Assuming the seat assembly 20 to be in the position for tractor operation, the seat 22 and support arm 30 will be in the solid line position as shown in FIG. 2. If it is then desired to position the seat assembly 20 for backhoe operation as shown in dashed lines in FIGS. 1 and 2, the operator will move his weight from the seat 22 and grasp the lever 96 and rotate it from the broken line position shown in FIG. 3 to the solid line position. This will cause the latch member 100 to be withdrawn from the latch receptacle 90 and at the same time will effect movement of the arm 76 from its broken line position as shown in FIG. 2 to its solid line position. The movement of the arm 76 to its solid line position shown in FIG. 2 will cause the pivot post 46 to be urged upwardly against the action of the spring 60 and will thus cause the seat 22 and the mounting bracket 42 to be moved upwardly far enough to disengage the pin 66 from the hole 68. The seat support arm 30 is lifted until the pivot post 46 is substantially vertical whereupon the seat is then pivoted clockwise about the post 46 until the pin 66 engages the rear stop block 74, this position of the arm being chosen for swivelling the seat since clearance for this maneuver is more likely at this position than any other, however, the seat may be swiveled at any position of the arm 30 where there is sufficient clearance. The arm 30 is then swung sufficiently far to align the latch member 100 with one or the other of the receptacles 92 and 94 whereupon the lever 96 is swung clockwise to move the member 100 into the latch receptacle with which it is aligned and to permit the pivot post 46 to lower and permit the pin 66 to enter the hole 70.

We claim:

1. A turn-around seat assembly, comprising: a seat support mounted for vertical movement about a first axis between first and second working positions; a latch release lever pivotally mounted on the seat support for movement about a second axis between a normal lock position and a release position; a first latch element fixed to the lever for movement therewith between lock and release positions corresponding to the lock and release positions of the lever, said first latch element including a cam surface means; a member fixed adjacent to the seat support and defining latch surface means arranged for cooperating with the first latch element for releasably retaining the seat support in a selected one of its working positions when the lever is in its normal lock position; a seat mounted on the seat support for swivelling about a third axis between first and second working positions disposed 180° from each other and corresponding to the first and second working positions of the seat support; a second latch element carried by the seat and being movable toward and away from the seat support between lock and release positions; said seat support including second latch surface means arranged for cooperating with the second latch element for releasably retaining the seat in a selected one of its operating positions when the second latch element is in its lock position; and link means being engaged with said cam surface means and kinematically connected between the cam surface means and the second latch element for effecting movement of the second latch element to its release position in response to movement of the first latch element to its release position by the lever; and means biasing the link means against the cam surface means and normally acting to retain the lever in its lock position.

2. The seat assembly defined in claim 1 wherein the second latch element is fixed to the seat and the seat and latch element are mounted for axial shifting movement along said swivel axis; and said link means being connected to the seat so as to effect movement thereof and consequently movement of the second latch element when the release lever is actuated.

3. The seat assembly defined in claim 2 wherein said seat includes a cylindrical post disposed on said swivel axis; said seat support including a tubular receptacle swivelly receiving said post; said second latch element being a pin disposed parallel to said swivel axis; and said second latch surface means including a pair of holes disposed on opposite sides of the swivel axis such that one of the pair of holes receives the pin when the seat is in one of its operative positions.

4. The seat assembly defined in claim 3 wherein said post includes an end projecting through said receptacle; said link means including a member pivotally mounted on the seat support for movement along the swivel axis and being positioned with a first side in contact with said end of the post and an opposite second side in contact with said cam surface means.

5. The seat assembly defined in claim 4 wherein the means biasing the link means includes a tension spring connected between said member pivotally mounted on the seat and the seat support.

6. The seat assembly defined in claim 4 wherein the post includes an abutment adjacent said end and said biasing means including a coil compression spring acting between the seat support and the abutment.

7. The seat assembly defined in claim 5 wherein the post includes an abutment adjacent said end and said biasing means including a coil compression spring acting between the seat support and the abutment.

8. The seat assembly defined in claim 4 wherein said member pivotally mounted on the seat support includes a plate portion having an angled end and said cam surface means including a flat portion engaged with the angled end when the lever is in its release position.

* * * * *